(12) United States Patent
Duan et al.

(10) Patent No.: US 9,443,169 B2
(45) Date of Patent: Sep. 13, 2016

(54) OBJECT CLASSIFICATION WITH CONSTRAINED MULTIPLE INSTANCE SUPPORT VECTOR MACHINE

(71) Applicant: Xerox Corporation, Norwalk, CT (US)

(72) Inventors: Kun Duan, Bloomington, IN (US); Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 244 days.

(21) Appl. No.: 14/186,337

(22) Filed: Feb. 21, 2014

(65) Prior Publication Data

US 2015/0242708 A1 Aug. 27, 2015

(51) Int. Cl.
*G06K 9/62* (2006.01)
*G06K 9/46* (2006.01)

(52) U.S. Cl.
CPC .......... *G06K 9/6269* (2013.01); *G06K 9/4642* (2013.01); *G06K 2209/23* (2013.01)

(58) Field of Classification Search
CPC .. G06K 9/00201; G06K 9/34; G06K 9/6277; G06K 9/4642; G06K 9/6269; G06K 9/6272; G06K 2209/23
See application file for complete search history.

(56) References Cited

U.S. PATENT DOCUMENTS

| 7,480,414 | B2 * | 1/2009 | Brown ............... G06K 9/00362 382/170 |
| 7,764,808 | B2 | 7/2010 | Zhu et al. |
| 8,358,808 | B2 | 1/2013 | Malinovskiy et al. |
| 8,537,409 | B2 | 9/2013 | Marchesotti et al. |
| 2009/0290802 | A1 * | 11/2009 | Hua ......................... G06K 9/34 382/225 |
| 2010/0091330 | A1 | 4/2010 | Marchesotti et al. |
| 2011/0002531 | A1 * | 1/2011 | Heisele ............ G06K 9/00208 382/154 |
| 2011/0184950 | A1 | 7/2011 | Skaff et al. |
| 2012/0269425 | A1 | 10/2012 | Marchesotti et al. |
| 2012/0308124 | A1 | 12/2012 | Belhumeur et al. |
| 2013/0016877 | A1 | 1/2013 | Feris et al. |
| 2013/0272573 | A1 * | 10/2013 | Feris .................. G06K 9/00771 382/103 |
| 2015/0242708 | A1 * | 8/2015 | Duan ................... G06K 9/6277 382/159 |

FOREIGN PATENT DOCUMENTS

WO    WO 2010/034065 A1    4/2010

OTHER PUBLICATIONS

Stuart Andrews et al, Support Vector Machines for Multiple-Instance Learning, 2002, Advance in Neural Information Processing Systems (NIPS), 8 pages.*
Duan, Kun et al., "Discovering Localized Attributes for Fine-grained Recognition", in CVPR, pp. 3474-3481, 2012.
Gu, Chunhui et al., "Discriminative Mixture-of-Templates for Viewpoint Classification", in ECCV (5), pp. 408-421, 2010.
Maji, Subhransu et al., "Part Discovery from Partial Correspondence", in CVPR, 2013, 8 pages.

(Continued)

*Primary Examiner* — Gregory M Desire
(74) *Attorney, Agent, or Firm* — Fay Sharpe LLP

(57) ABSTRACT

This disclosure provides method and systems of classifying a digital image of an object. Specifically, according to one exemplary embodiment, an object classifier is trained using a constrained MI-SVM (multiple instance-support vector machine) approach whereby training images of objects are sampled to generate a collection of image regions associated with an object type and viewpoint, and the classifier is trained to determine an appropriate mid-level representation of the training image which is discriminative.

22 Claims, 13 Drawing Sheets

(56) References Cited

OTHER PUBLICATIONS

Sharma, Gaurav et al., "Expanded Parts Model for Human Attribute and Action Recognition in Still Images", in IEEE Conference on Computer Vision and Pattern Recognition, (CVPR), 2013, 8 pages.
Tsochantaridis, Ioannis et al., "Support Vector Machines for Polycategorical Classification", in ECML, pp. 456-467, 2002.
Yao, Bangpeng et al., "Combining Randomization and Discrimination for Fine-Grained Image Categorization", in IEEE Conference on Computer Vision and Pattern Recognition (CVPR), Springs, USA, Jun. 16-21, 2011, pp. 1577-1584.
Andrews, Stuart et al., "Support Vector Machines for Multiple-Instance Learning", 2003, Department of Science, Brown University, 8 pages.
"DOT product", Wikipedia, en.wikipedia.org/wiki/Dot_product, 1 page, printed Feb. 20, 2014.
Berwick, R., "An Idiot's Guide to Support Vector Machines (SVMs)", 25 pages, www.cs.ucf.edu/courses/cap6412/fall2009/papers/Berwick2003.
Ben-Hur, Asa et al., "A User's Guide to Support Vector Machines", pp. 223-239, copyright 2010, Chapter 13, Book Title: Data Mining Techniques for the Life Sciences.
Fisher Vectors: Beyond Bag-of-Visual-Words Image Representations, 7 pages, SpringerLink, printed Aug. 21, 2013 from Link. springer.com/chapter/10.1007%2F978-3-642-25382-9_2.
Weston, Jason, "Support Vector Machine", NEC Labs America, Princeton, USA, 34 pages, www.cs.columbia.edu/~kathy/cs4701/ documents/jason_svm_tutorial.pdf, printed Feb. 20, 2014.
Sanchez et al., "Image Classification with the Fisher Vector: Theory and Practice", International Journal of Computer Vision, 23 pages. See vol. 105, Issue 3, Dec. 2013.
Fletcher, Tristan, "Support Vector Machines Explained", Mar. 1, 2009, 19 pages, www.cs.ucl.ac.uk.staff/T.Fletcher/.

* cited by examiner

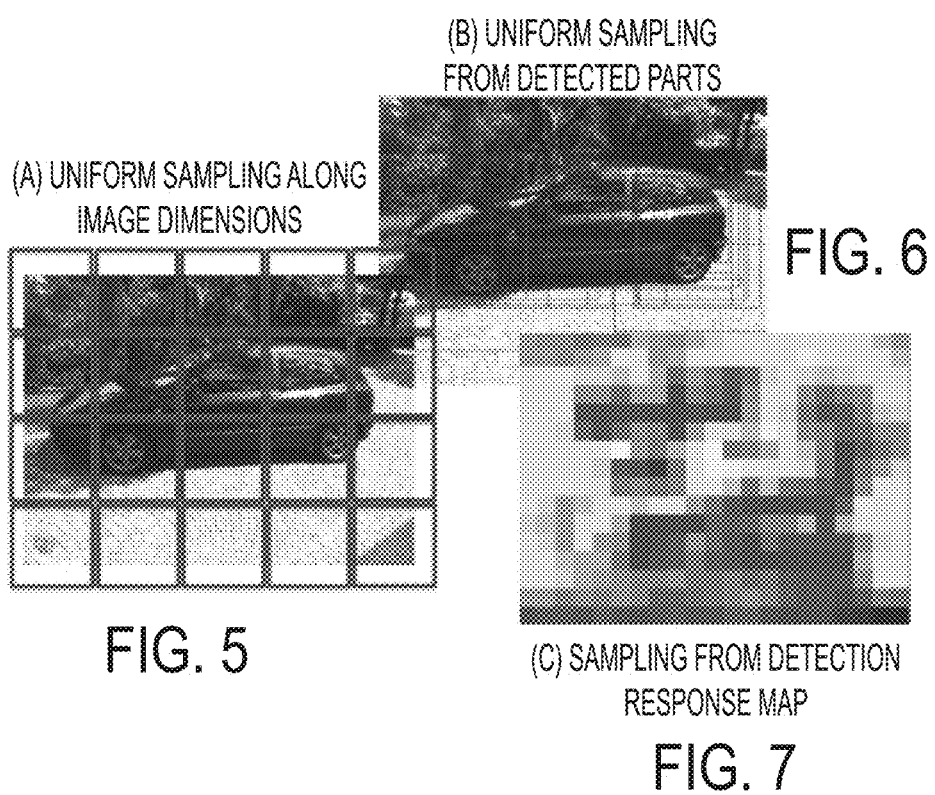
FIG. 5 (A) UNIFORM SAMPLING ALONG IMAGE DIMENSIONS
FIG. 6 (B) UNIFORM SAMPLING FROM DETECTED PARTS
FIG. 7 (C) SAMPLING FROM DETECTION RESPONSE MAP

OBJECT CLASSIFICATION WITH CONSTRAINED MULTIPLE INSTANCE SUPPORT VECTOR MACHINE

BACKGROUND

Aspects of the exemplary embodiment disclosed herein relate to a method and system for classifying a digital image of a three-dimensional object such as a vehicle according to object type, such as vehicle tree.

Vehicle recognition is a challenging task with many useful applications. With the explosive growth of new vehicle models every year, recognizing different types of vehicle models is a difficult problem and people have been working on developing machine algorithms to recognize vehicles for years.

Visual attributes have been shown to be effective for many computer vision problems. Attributes are considered discriminative and semantic mid-level image representations.

Previously, local discriminative regions for image classification tasks have been explored. In Bangpeng Yao et al., "Combining Randomization and Discrimination for Fine-Grained Image Categorization", CVPR, 2011, pp. 1577-1584, the authors propose to use a random forest with dense sampling to discover discriminative regions. The random forest combines thousands of region classifiers together, and thus improves the classification performance using only low-level image features.

Recently there has been work on automatic "part discovery" for different object categories. Subhransu Maji et al., "Part Discovery from Partial Correspondence", CVPR, 2013, describes an approach to collect pairs of user click annotations on landmark images. The method disclosed in Subhransu Maji et al., uses a SVM (Support Vector Machine) method to find salient regions, while using the click pair information to jointly infer object parts. One problem is that the Subhransu Maji et al., method does not optimize classification accuracy at the object level.

Provided herein are methods and systems to automatically discover a mid-level image representation, i.e., a set of attributes, using constrained multiple instance Support Vector Machines (SVMs).

Incorporation By Reference

The following references, the disclosures of which are incorporated in their entireties by reference, are mentioned:

U.S. Patent Application Publication No. 2012/0308124, published Dec. 6, 2012, by Belhumeur et al., entitled "Method and System for Localizing Parts of an Object in an Image for Computer Vision Applications";

Kun Duan et al., "Discovering Localized Attributes for Fine-grained Recognition", CVPR, pages 3474-3481, 2012;

U.S. Patent Application Publication No. 2013/0016877, published Jan. 17, 2013, by Feris et al., entitled "Multi-View Object Detection Using Appearance Model Transfer from Similar Scenes";

Chunhui Gu et al., "Discriminative Mixture-of-Templates for Viewpoint Classification", ECCV (5), pages 408-421, 2010;

Subhransu Maji et al., "Part Discovery from Partial Correspondence", CVPR, 2013;

U.S. Pat. No. 8,358,808, issued Jan. 22, 2013, by Malinovskiy et al., entitled "Video-Based Vehicle Detection and Tracking Using Spatio-Temporal Maps";

WO 2010/034065 A1, by Kostia et al., published Apr. 1, 2010, entitled "Detection of Vehicles in an Image";

Gaurav Sharma et al., "Expanded Parts Model for Human Attribute and Action Recognition in Still Images", 2013;

Ioannis Tsochantaridis et al., "Support Vector Machines for Polycategorical Classification", ECML, pages 456-467, 2002;

Bangpeng Yao et al., "Combining Randomization and Discrimination for Fine-Grained Image Categorization", 2011, pages 1577-1584; and U.S. Pat. No. 7,764,808, issued Jul. 27, 2010, by Zhu et al., entitled "System and Method for Vehicle Detection and Tracking".

BRIEF DESCRIPTION

In one embodiment of this disclosure, described is a computer implemented method of classifying a digital image of an object as one of a plurality of object types. The method includes a) receiving the digital image of the object; and b) with a processor, classifying the digital image as including one of the plurality of object types by accessing a constrained multiple-instance support vector machine (MI-SVM) classifier. The constrained MI-SVM classifier has been automatically trained using a plurality of training images including a plurality of object types from a plurality of viewpoints, each training image including a object image associated with one of the plurality of object types and one of a plurality of viewpoints, an associated object type label and an associated viewpoint label. The constrained MI-SVM classifier has been trained by performing a sampling of each training image to generate a plurality of image regions providing a bag of image regions associated with each training image and discovering a discriminative region associated with each training image and generating a collection of discriminative image region representations for each of the plurality of object types and each of the plurality of viewpoints.

In another embodiment of this disclosure, described is an image processing system including a controller configured to receive a digital image of an object including one of a plurality of object types. The controller is configured to execute instructions to perform a method of classifying the digital image of the object as one of the plurality of object types. The method includes a) receiving the digital image of the object; and b) classify the digital image as including one of the plurality of object types by accessing a constrained multiple-instance support vector machine (MI-SVM) classifier. The constrained MI-SVM classifier has been automatically trained using a plurality of training images including a plurality of object types from a plurality of viewpoints, each training image including an object image associated with one of the plurality of object types and one of a plurality of viewpoints, an associated object type label and an associated viewpoint label. The constrained MI-SVM classifier has been trained by performing a sampling of a plurality of image regions providing a bag of image regions associated with each training image and discovering a discriminative region associated with each training image and generating a collection of discriminative image region representations for each of the plurality of object types and each of the plurality of viewpoints.

In still another embodiment of this disclosure, described is a computer implemented method of training a constrained multiple instance support vector machine (MI-SVM) classifier to classify digital images including an object according to one of a plurality of object types. The method includes inputting to the constrained MI-SVM classifier a plurality of training images, each training image including an object image associated with one of the plurality of object types and one of a plurality of viewpoints, an associated object type label and associated viewpoint label. The constrained MI-SVM classifier samples each training image to generate a plurality of image regions providing a bag of image regions associated with each training image. The constrained MI-SVM classifier processes the bags of image regions associated with each training image to discover a discriminative region associated with each training image and generate a collection of discriminative image regions for each of the plurality of object types and each of the plurality of viewpoints.

BRIEF DESCRIPTION OF THE DRAWINGS

FIG. 5 shows uniform sampling of an image along image dimensions according to an exemplary embodiment of this disclosure.

FIG. 6 shows uniform sampling of an image according to another exemplary embodiment of this disclosure, where uniform sampling is performed in a region of the image where a vehicle is detected.

FIG. 7 shows sampling of an image associated with a vehicle detection response map according to an exemplary embodiment of this disclosure.

DETAILED DESCRIPTION

Figure 1:
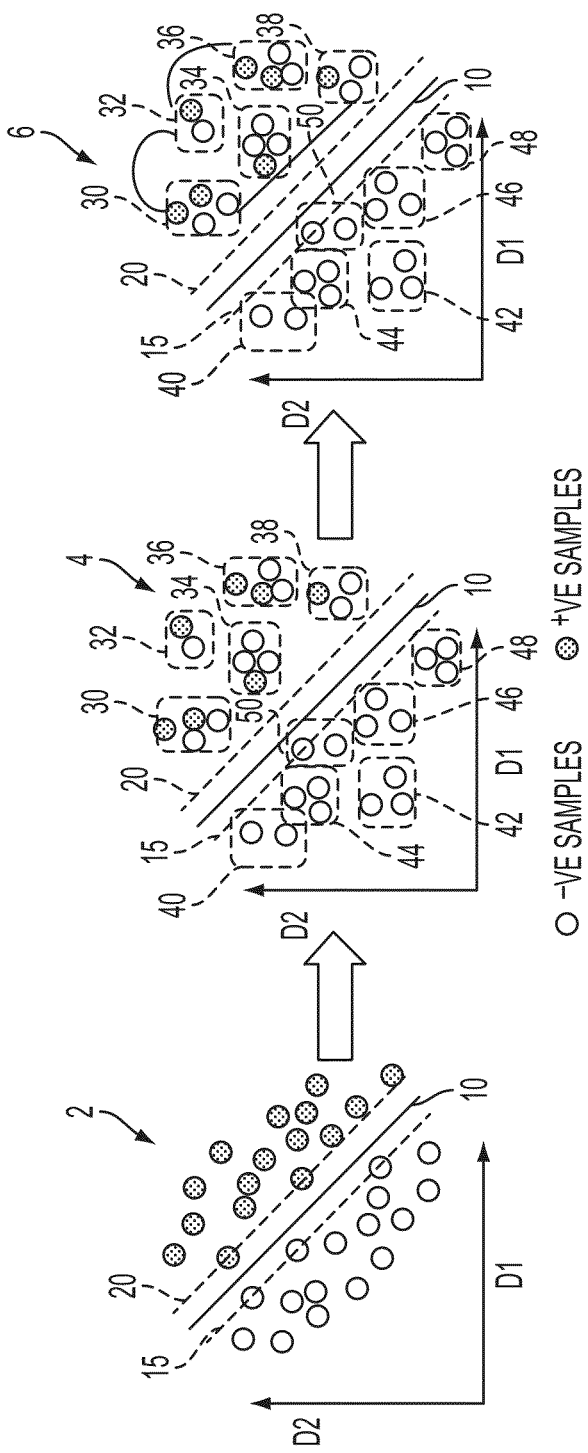
FIG. 1 includes a standard SVM (Support Vector Machine) classifier (left), a standard MI-SVM (Multiple Instance-Support Vector Machine) classifier (middle), and a constrained MI-SVM classifier (right).

This disclosure provides a computer vision method and system to automatically discover visual attributes associated with digital images of three-dimensional objects, such as vehicles, that are useful in classification. While particular reference is made to vehicles, such as automobiles, it is to be appreciated that the method finds application in classification of images of other objects. For purposes of this disclosure, visual attributes refer to representative sub-regions of a digital image that may carry a semantic meaning and which are discriminative relative to other sub-regions associated with digital images of another vehicle type, for example vehicle model. Several applications, such as vehicle classification and query-by-concept searching, may benefit from incorporating the classification methods and systems disclosed herein. Specific examples include automatically annotating vehicle images on a car sales websites with rich textual descriptions and/or a personalized vehicle retrieval system based on input from a user's text queries, e.g., gray, (manufacture model), three doors with scratches, etc. The method is based on a multiple instance SVM (MI-SVM) framework where a MI-SVM is learned per class of a vehicle, and the "selected instances" correspond to discovered attributes associated with the class. The exemplary method/system: (i) frames the visual attribute discovery problem into an MI-SVM framework, (ii) "disaggregates" a positive instance selection in the MI-SVM to take into account visual and spatial constraints, (iii) deals with multiple viewpoints, and (iv) is applied to vehicle classification.

Attributes are discriminative and semantic mid-level image representations. Provided herein are methods and systems to discover such mid-level representations using constrained multiple instance SVMs by explicitly modeling viewpoint classes. The exemplary approach is an iterative method and starts with sampling image regions on each training image, sometimes referred to as patches in this disclosure, and treating the image regions as attribute candidates. Then, a MI-SVM model is used to learn discriminative regions for one attribute per image. These learned attributes are used to enhance the image representations and also bias the image region sampling in the next iteration. The result of this iterative approach is a collection of mid-level representations for vehicle images, where the collection only includes discriminative image regions. In other words, not all image regions sampled to train the classifier are part of the resulting classifier collection of discriminative image regions.

There are several challenges for vehicle recognition. For example, vehicle categories may be "fine-grained" and have local differences, however, the global shapes and visual cues tend to be very similar with each other. Another challenge is the viewpoint variation. Vehicles are 3D (Dimensional) objects, but the photographs and the vehicles are simply their 2D counterparts, which are projected from the 3D space, thus a lot of information is lost. In addition, background noise also raises challenges due to ambiguities in the low-level features.

MI-SVM models are described, for example in Ioannis Tsochantaridis et al., "Support Vector Machines for Polycategorical Classification", in ECML, pages 456-467, 2002. One motivation for discovering discriminative mid-level representations is based on the following observations: 1) local attributes are associated with vehicle viewpoints; and 2) each training image can be considered as a bag of image patches.

The disclosed method and system enables automatically discovering discriminative local attributes for different vehicle categories, i.e. models. The discovered collection of local attributes serve as an image representation which improves vehicle classification performance. Additionally, the discovered attributes can be assigned semantic meanings, which allows cross-modal applications, such as querying vehicles using textual descriptions.

In one exemplary embodiment, discriminative local attributes for vehicle categories are obtained using the following processes: image region sampling, feature extraction, constrained MI-SVM training, and image classification using discovered attributes. Viewpoints associated with an image region are treated as latent labels, i.e., subclasses, and are jointly learned with the local attributes. For purposes of this disclosure, a viewpoint label indicates a particular viewpoint of a 2D image or image region relative to a 3D object associated with the 2D image or image region. For example, a 3D object such as a vehicle may be captured in a 2D image from one of a plurality of viewpoints, such as frontal viewpoint, rear viewpoint, driver side viewpoint, passenger side viewpoint, etc. Alternatively, a viewpoint can be expressed as an angle relative to a reference axis, for example, 90°, 180°, 270°, etc., relative to a longitudinal axis associated with a vehicle.

With reference to FIG. 1, shown are examples of a standard SVM classifier 2, a standard MI-SVM classifier 4 and an exemplary constrained MI-SVM classifier 6, according to this disclosure. As shown, each classifier may include a plurality of dimensions, e.g., 2D, 3D, 4D, etc., however, for purposes of illustration only, two dimensions, i.e., D1 and D2, are shown. Each classifier includes positive image region samples indicated as "+VE" and negative image region samples indicated as "−VE". In addition, each classifier includes a hyperplane 10 and an associated margin defined by margin boundaries 15 and 20.

As indicated in FIG. 1, a standard SVM classifier 2 does not require any relationship between positive samples to provide a positive classification of an image region. In contrast, a standard MI-SVM classifier 4 provides a supervised classification process in which training class labels are associated with bags of patches, for example "bags of regions" 30, 32, 34, 36 and 38 provide positive bag samples if at least one of its member image regions, i.e., patches, is a +VE sample. Bags of regions 40, 42, 44, 46 48 and 50 do not include at least one +VE sample and are considered negative bag samples. In further contrast to standard MI-SVM classifier 4, the constrained MI-SVM classifier provides a supervised classification process in which training class labels are associated with groups of "bags of patches", for example, a group including "bags of regions" 30, 32, and 36 illustrated in FIG. 1.

As briefly described above with reference to FIG. 1, each image is treated as a bag of "regions", and the disclosed exemplary embodiments apply a multiple instance learning framework to find the most discriminative of these regions. The disclosed modification to the standard MI-SVM model allows pairwise constraints on object geometry, thus enabling the discovery of semantic and discriminative regions.

The method and system disclosed herein learns a set of regions by maximizing the classification performance through a multiple instance learning framework.

The modification of the standard MI-SVM by introducing pairwise constraints is first described, followed by a sampling strategy for generating region candidates.

MI-SVM with Constraints

It is assumed that a training set of labeled images is available where regions $S_I^i$ of the images are grouped into bags I and a category label Y is attached to each bag.

The standard MI-SVM is formulated as below:

$$\min_{w,C,b} \frac{1}{2}\|w\|^2 + C\sum_I \xi_I$$

s.t. (subject to)

$$Y_I \cdot \max_i(w \cdot x_I^i + b) \geq 1 - \xi_I, \xi_I \geq 0$$

where $Y_I$ is the category label (+1 or −1) of any bag I (assuming binary category labels), C is a constant, $\xi_I$ is a slack variable, b is a constant, and w is the normal vector to the hyperplane, the parameter $$\frac{b}{\|w\|}$$

determines the offset of the hyperplane from the origin along the normal vector. This model ignores the viewpoint of the image.

To automatically discover discriminative local attributes for different vehicle categories, it is desired to learn one MI-SVM for each attribute in each vehicle category, and also take in account the viewpoint. One bag corresponds to a collection of image regions extracted from one training image, and the instances in the bag correspond to the image regions themselves. The instances in bag I are represented as a set of tuple $\{(x_I^i, y_I^i, v_I)\}$, where $y_I^i$ is the category label of instance $x_I^i$, and $v_I$ is the viewpoint label for bag I selected from a predefined set of viewpoints. The goal is to find the discriminative patches, i.e. image regions, which are denoted as the local attributes.

In one aspect of the present method, it is assumed the viewpoint labels are given. In general, one local attribute can always be associated with a particular vehicle viewpoint. For example, if a perfect round wheel is observed, an observer would recognize that the vehicle is probably being viewed from a "side-view" associated with the vehicle, with some exceptional cases. In addition, image regions can be randomly sampled for one attribute, and the image will then become a bag of image regions. Based on these principles, each local attribute can be formulated using a MI-SVM, plus pairwise spatial and appearance constraints among positive instances:

$$\min_{\{w^{(v)}, C^{(v)}\}} \sum_{v=1}^{V} \left( \frac{1}{2}\|w^{(v)}\|^2 + C^{(v)} \sum_{I^{(v)}} \xi_{I^{(v)}} \right) \quad (1)$$

s.t. (subject to)

$$Y_I \cdot (w^{(v)} \cdot x_I^{S_I} + b^v) \geq 1 - \xi_{I^{(v)}}$$

where W represents a hyperplane slope of a hyperplane associated with the MI-SVM,
c is a cross validated selective constant,
b represents an offset of the hyperplane,
I represents a bag of image regions associated with a training image,
$S_I$ represents an image region selected for bag I;
v represents a view point,
V represents a total number of viewpoints v,
$x_I^{S_I}$ represents an image region selected from bag I,
$Y_I$ represents the object type label associated with bag I, and
$\xi_{I^{(v)}}$ represents a fixed value.

In other words, a set of hyperplane vectors $w^{(v)}$ is assumed, one per each viewpoint, and the instance selection step is separated from the original MI-SVM.

An iterative approach is taken between training the set of hyperplane vectors $\{w^{(v)}\}$ and reasoning about instance selections on positive bags. Let $L_I$ be a variable which takes its value on the instance indices inside bag I. Instead of looking for the best instance for each bag separately, a holistic approach is used, and the problem is formulated using a CRF (Conditioned Random Field):

$$E(\{L_I\} \mid \{v_i\}) = \sum_I \varphi(L_I \mid v_I) + \sum_I \sum_J \delta(L_I, L_J \mid v_I, v_J) \qquad (2)$$

The result of performing inference on the above CRF is a set of instance selections for all bags. The unary terms are defined using the $\{w^{(v)}\}$, where $$\varphi(L_I \mid v_I) = -(w^{(vI)} \cdot x_I^{L_I} + b^{(vI)})$$

and the pairwise terms take into account both geometry and appearance constraints, the pairwise terms $(L_I, L_J \mid v_I, v_J)$ account for geometry and appearance constraints relative to a plurality of viewpoints, $L_I$ and $L_J$ represents a variable based on indices of an image region selected within bag I, E represents an energy function which is minimized, $\delta$ is an energy term, and $\varphi$ is an energy term.

The instance selections on negative bags remain the same as in the original MI-SVM formulation.

The third approach is suited to cases in which the objects are at different scales. Where the images have vehicle objects at relatively the same scales, the first method can be used as a region generation method, as described in the experiments below. For such images, it was found the first method generates region candidates with comparable visual qualities while being simple and efficient.

Figure 2:
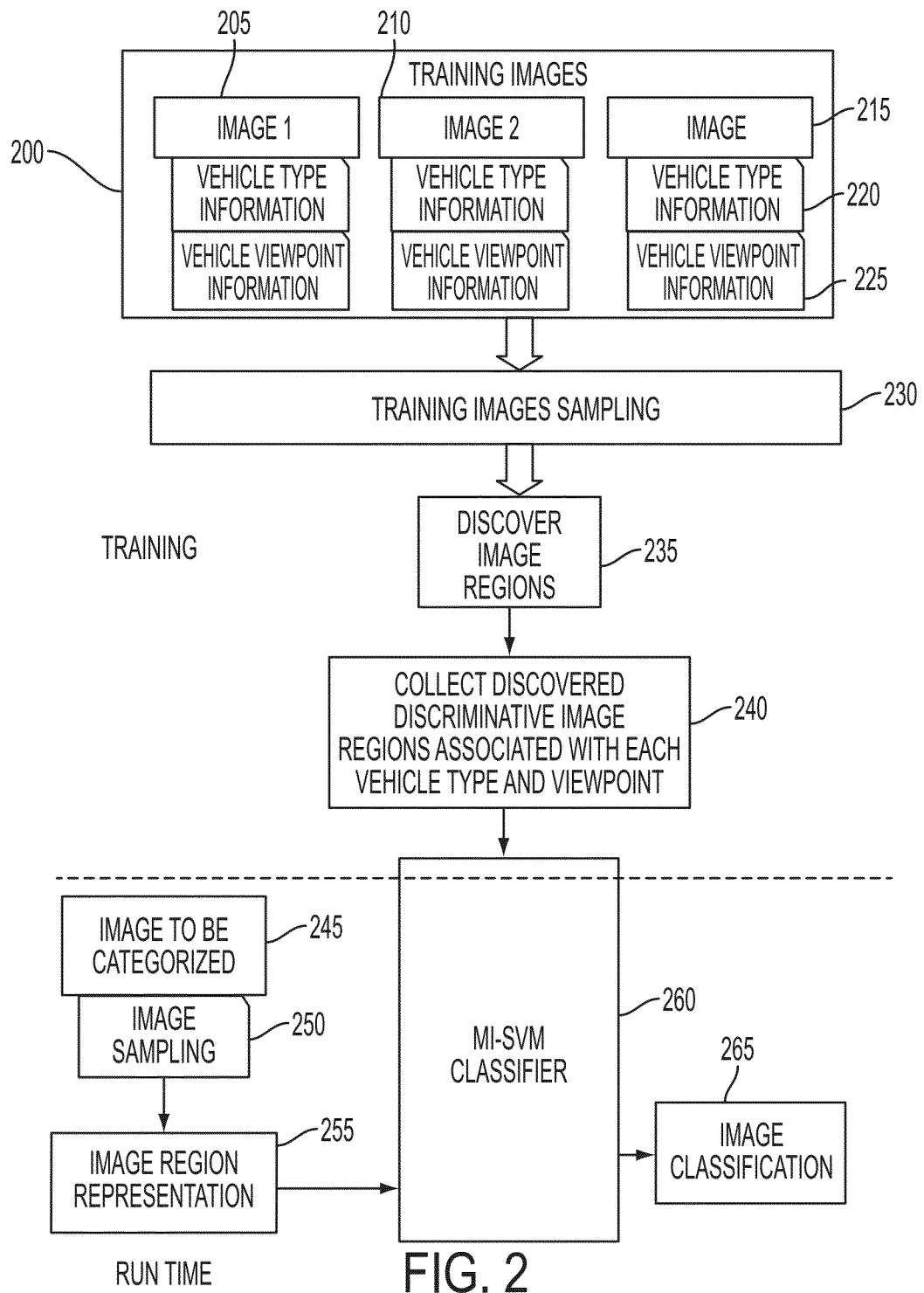
FIG. 2 is a block diagram of a system/method of classifying a vehicle image using a trained classifier according to an exemplary embodiment of this disclosure.
Figure 3:
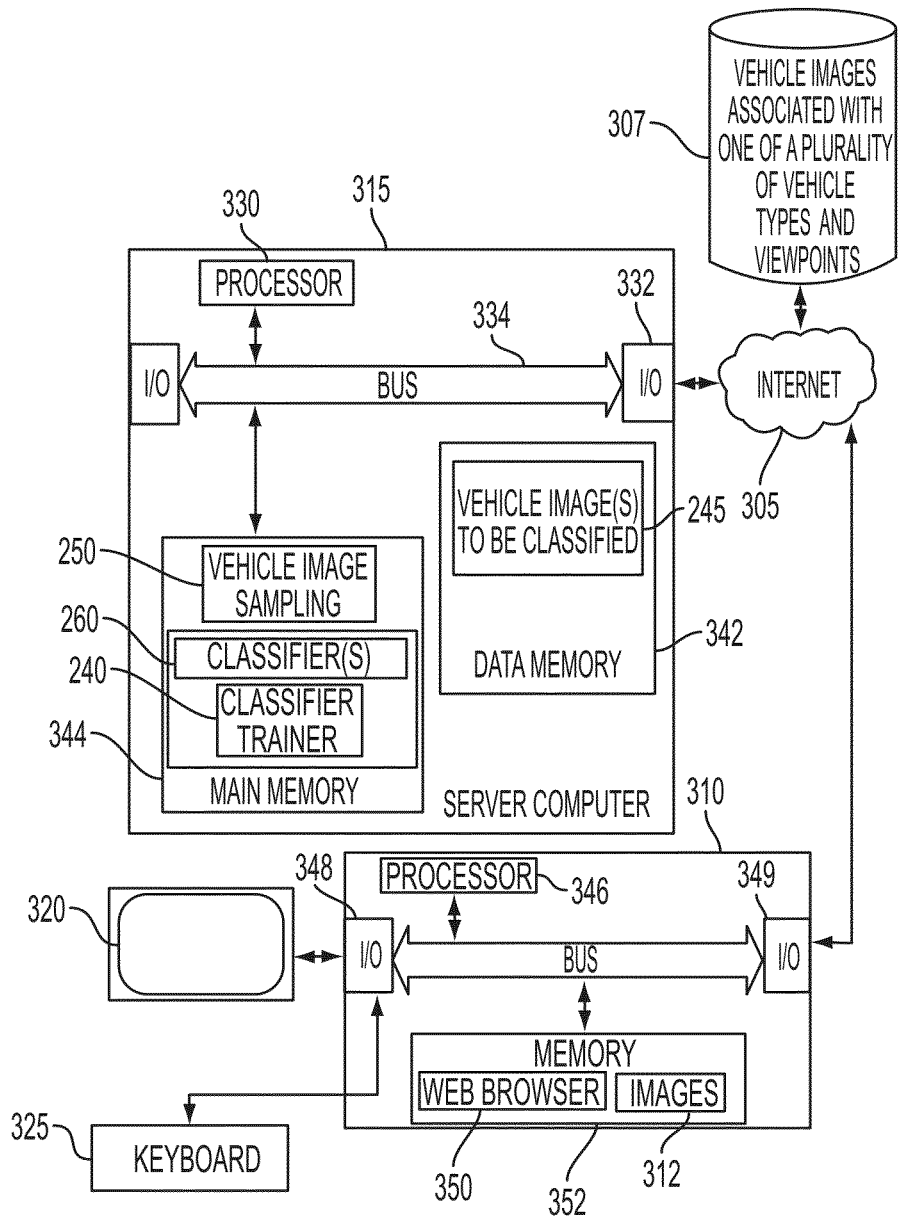
FIG. 3 is a block diagram of a system/method of training a classifier according to an exemplary embodiment of this disclosure.
Figure 4:
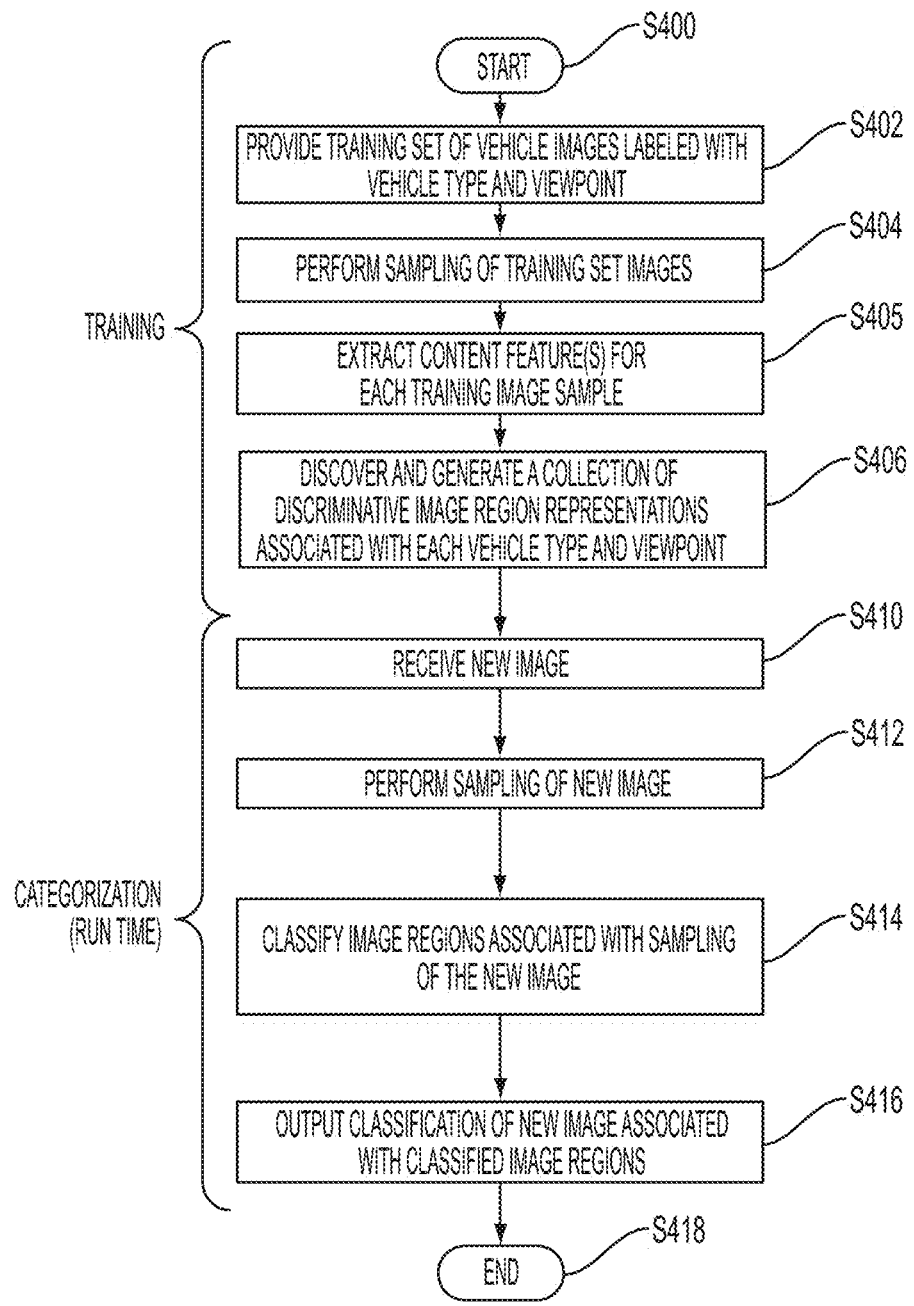
FIG. 4 is a flow chart of a method of training a vehicle classifier according to an exemplary embodiment of this disclosure, as well as a method of classifying a vehicle using the trained classifier.

With reference to FIGS. 2-4, illustrated and described now are various exemplary embodiments of the disclosed method and system of training a classifier using a MI-SVM approach as well as exemplary embodiments of the disclosed method and system of classifying a digital image of a vehicle using an MI-SVM trained classifier.

Referring to FIG. 2, an overview of a system and method of classifying a vehicle image using a trained classifier is illustrated.

As shown in FIG. 2, at run time the exemplary system performs image sampling 250 on an image to be categorized 245, i.e. classified. This process generates image region representations 255, as previously described, which are input to an MI-SVM classifier 260. Then, the MI-SVM classifier 260 classifies the image region representations 255 for an image region representation 255 which provides an image classification 265 for the initial image to be categorized 245.

As also shown in FIG. 2, the MI-SVM classifier 260 is trained to classify the image region representations 255 by initially discerning and collecting discriminative image regions 200 associated with a plurality of vehicle categories, e.g., vehicle models. A plurality of training images 205, 210 and 215, along with associated vehicle types 220 and viewpoint information 225 are sampled 230, as previously described, to generate a plurality of image regions for each training image 205, 210 and 215. Then, the training process discovers discriminative image regions 235 associated with each vehicle type and viewpoint and collects 240 these discovered discriminative image regions which are used to train the MI-SVM classifier 260, where the collection only includes discriminative image regions. In other words, not all image regions sampled to train the classifier are part of the resulting classifier collection of discriminative image regions.

With reference to FIG. 3, an exemplary environment in which the image classifier system operates is illustrated. The system includes one or more computing devices, such as the illustrated server computer 315, and includes memory, here illustrated a main memory 344 and data memory 342, a processor 330, such as the computer's CPU, and one or more network interfaces (I/O) 336 for communicating with other devices, all communicatively linked by a data/communication bus(es) 334. The computer may be a PC, such as a desktop, laptop, palm computer, portable digital assistant (PDA), digital camper, server computer, cellular telephone, table computer or other computing device(s) capable of executing instructions for performing the exemplary method.

The network interface 332 allows the computer to communicate with other devices via a wired or wireless links, such as computer network 305, e.g. a local area network (LAN), wide area network (WAN), such as the internet, telephone line, wired connection, or a combination thereof.

An image 245 to be categorized is input to the system from a source of images, such as a general purpose or specific purpose computing device, such as a PC, laptop, camera, cell phone or the like, or from a non-transitory memory storage device, such as a flash drive, disk, portable hard drive, camera memory stick, or the like. In the exemplary embodiment illustrated, the source 310 is a client computing device which includes memory 352 which stores the images 312 and a web browser 350 for uploading images to a web portal hosted by the server computer, which is implemented by a processor 346. Memory 352 and processor 346 can be similarly configured to memory 342, 344 and processor 330. One or more interfaces 348, 349 allow the computer 310 to communicate with the system and with a display device 320, such as a computer monitor, LCD screen or the like, and one or more user input devices 325, such as a touch screen, keyboard, keypad, cursor control device, or combination thereof.

A set of training images, such as training images 205, 210 and 215, is stored in a database(s). The database(s) may be stored in memory 342 or in other memory 307 accessible to the system, e.g. via network 305.

Images 245 may be received by the system in any convenient file format, such as JPEG, TIFF, GIF, JBIG, BMP, or other common file format used for images and which may optionally be converted to another suitable format prior to processing. Images may be individual photographs, video images, combined images which include text/graphics as well as a photograph, and the like. In general, each input digital image includes image data for an array of pixels forming the image. The image data may include colorant values, such as grayscale values, for each of a set of color separations, such as RGB, or be expressed in another color space in which different colors can be represented. In general, "grayscale" refers to the optical density value of any single color separation; however, expressed (RGS, L*a*b*, YCbCr, etc.). The exemplary system and method and applicable to monochrome images as well as to multicolor images. As used herein, "image data" does not include the textual information which may accompany the image data, e.g. as meta data, an HTML tag, information in an associated file, or the like.

The system includes software instructions stored in main memory 344 for performing the exemplary method illustrated in FIGS. 2 and 4. These instructions are executed by processor 338 and a classifier training component 240 which learns an MI-SVM classifier 260. The classifier 260 may include one or more discriminative classifiers, as previously described. For example a plurality of classifiers where each classifier functions as a classifier for a predetermined viewpoint.

With reference to FIG. 4, a flowchart is illustrated of a method of training a vehicle classifier according to an exemplary embodiment of this disclosure, as well as a method of classifying a vehicle using the trained classifier.

After the start S400 of the method, S402 provides a training set of vehicle images including labels specifying for each image a vehicle type (category) selected from the predefined set of vehicle categories and a viewpoint selected from the predefined set of new points.

At S404, the method performs sampling of each training set image to generate a bag of image regions associated with each training set image.

Next, at S405, the method extracts content feature(s) for each training image sample, i.e. image region.

At S406, the method discovers and generates a collection of discriminative image region representations associated with each vehicle type and viewpoint included in the training set of vehicle images.

In other words, each image is treated as a collection of image regions, and the task is to iteratively select one region for each training image. To do this, a multiple instance learning (MIL) framework is used to pick the best region for each image, while constraining vehicle images with same viewpoint angles to have the regions selected so that they are on similar locations on the vehicle, e.g., measured by Euclidean distance between two regions. The region selection process is iterated until the classification performance cannot be improved using the selected regions.

At S410, at run time, a new non-training image including a vehicle to be classified is received.

At S412, the method performs sampling of the new image to generate a plurality of image regions associated with the new image.

Next, at S414, the method classifies image regions associated with sampling of the new image, where the method classifies the image region using an MI-SVM classifier associated with the collection of discriminative image regions generated in S406.

At S416, the method outputs a classification of the new image associated with the classified image regions.

Finally, at S418, the method ends.

Sampling Image Regions

With reference to FIGS. 5-7, considered are three different ways to generate region candidates for each training image. The first method, shown in FIG. 5, applies an object detector, such as a generic DPM (Deformable Parts Model) car detector to get the most confident detection, and then uniformly samples region squares inside the detection bounding box. This method is fast and reliable due, in part, to good performance of deformable part-based models. The second method, shown in FIG. 6, also applies the DPM car detector, but collects multiple detections and the corresponding part localizations, and then uniformly samples from these part detection bounding boxes. This method is similar to that of Subhransu Maji et al., "Part Discovery from Partial Correspondence", CVPR, 2013. In the third method, shown in FIG. 7, a pre-trained classifier, such as PASCAL VOC (Visual Object Classes) car detector is used, which is applied to each training image to generate detection heat maps at different scales. Then, location (x,y) is sampled on the image by treating the heat maps as probability density distributions and using the closest candidate as the sampled instance.

According to an exemplary embodiment of the disclosed method and system of classifying a digital image of an object, Fisher Vectors are used as multiple dimensional vector representations of image regions. The Fisher Vectors are used as representations of image regions for training the MI-SVM classifier and generating representations of image regions to be classified. Two datasets were considered for testing of the disclosed MI-SVM classification method and system. A first BMVC (British Machine Vision Conference) car dataset providing 14 car categories, with 68 images in each training category and 34 images in each testing category. A second INRIA® (French Institute for Research in Computer Science and Control) car dataset providing 10K images for 29 categories, with equal splits for training and testing. The images from both datasets are from exemplary vehicle sales websites, so there exists viewpoint angle bias; for example, images in the first dataset are mostly from 45 and 135 degrees.

Single Region Performance

Figure 8:
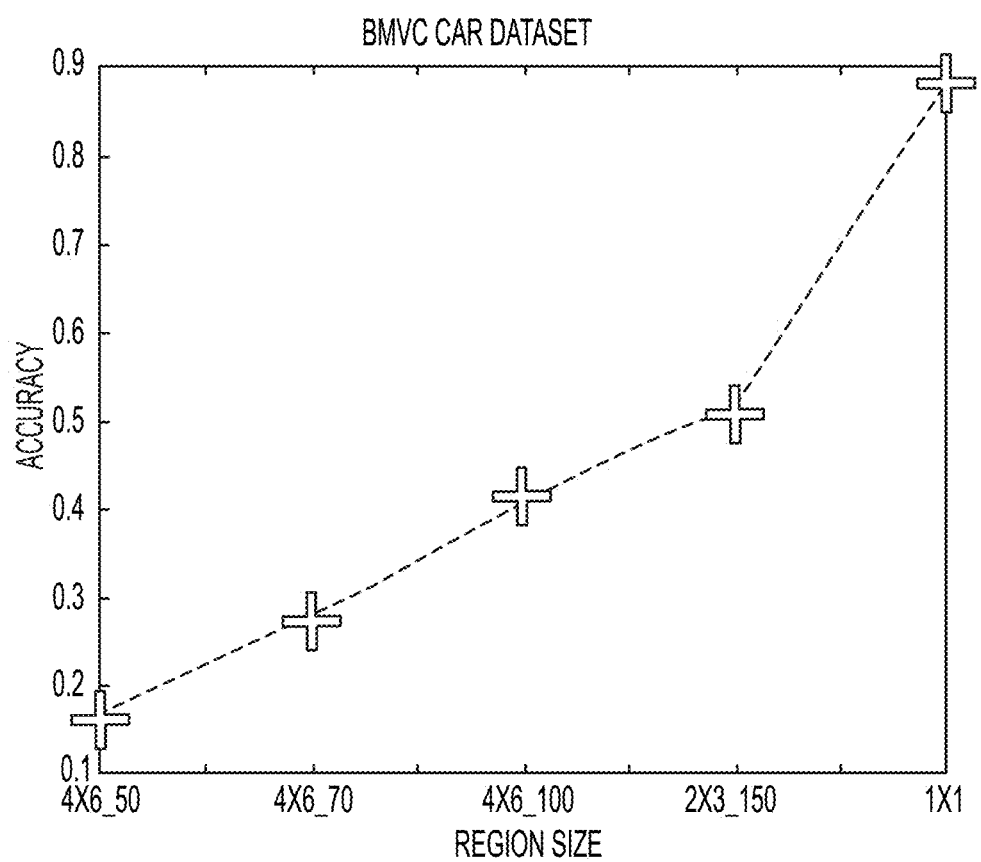
FIG. 8 is a plot of the accuracy of an exemplary vehicle classifier relative to sampled image region size for a BMVC (British Machine Vision Conference) car dataset.
Figure 9:
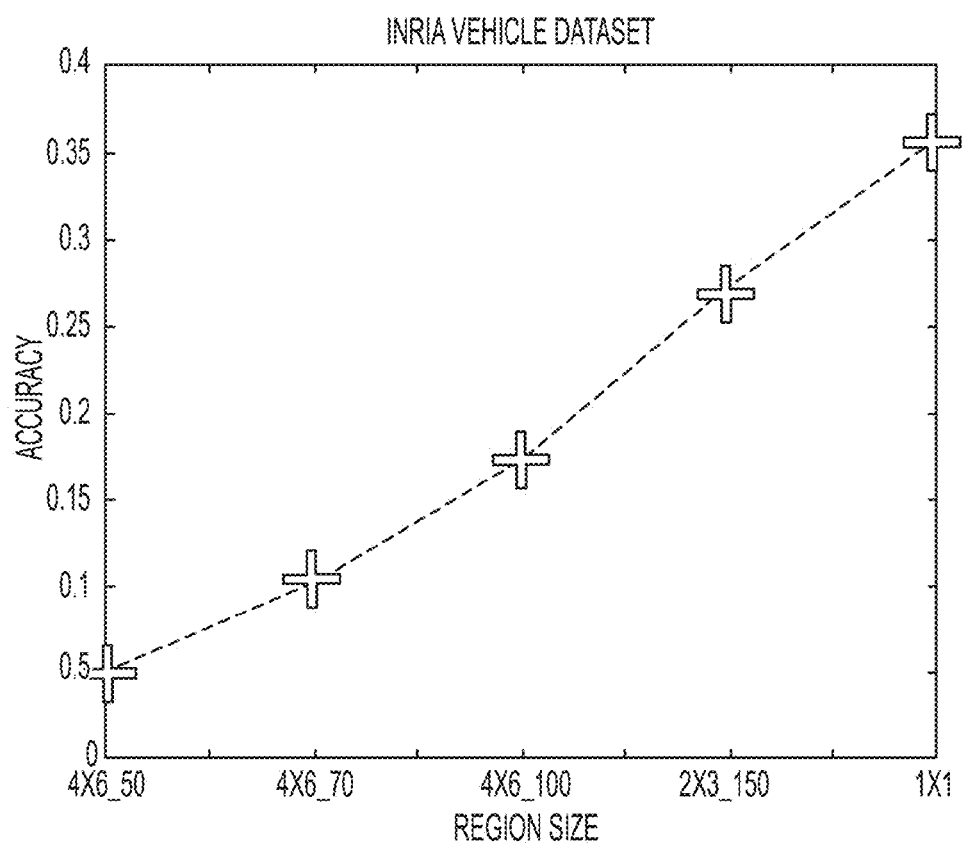
FIG. 9 is a plot of the accuracy of an exemplary vehicle classifier relative to sampled image region size for an INRIA® vehicle dataset.

To validate the region pooling parameters and test how the disclosed sampling strategy is related to accuracy, the trained constrained MI-SVM classifiers were trained on the regions generated from each test image. The results are summarized in FIGS. 8 and 9, where it was found that the performance for classifying single regions drops down as the region size become smaller. This makes intuitive sense because information is lost when the image is broken into small pieces. For example, it is difficult even for humans to tell the difference between two vehicle categories if only the wheel parts are shown to them. It was also found that the visual quality of selected regions is also related to region size. If the size is too big or too small, visual quality goes down. To increase quantitative performance, bigger regions should be used; but the interpretability and locality of attributes are lost. In contrast, if very small regions are used, then the semantics of a single region cannot summarize a meaningful visual content and the quantitative performance also drops. Thus there is a tradeoff between discriminability and semantic meaningfulness. In practice, 4×6 grids were used on each vehicle detection bounding box and each extracted region is a 50×50 pixel image region. Multi-scale regions were not used in this case because of the fact that scale variability of vehicle parts is low, e.g. a headlight in one model of vehicle can be more or less the same size of a headlight on a different model vehicle. In addition, all detection bounding boxes were normalized to have unit heights.

Multiple Region Performance

It has been shown that multiple attributes outperform single attributes in image classification tasks. See Kun Duan et al., "Discovering Localized Attributes for Fine-grained Recognition", CVPR, pp. 3474-3481, 2012. In order to use multiple attributes for classification task, the discovered attributes need to be assembled and used to build new representations for the training images. In practice, each attribute classifier is applied to every single training image, and all such binary decisions are collected. A T=(K×A) table is built, where K is the number of categories and A is the number of attributes. If more than half of the images in a category k have the attribute α, then we set T(k,α)=1, otherwise T(k,α)=0. The table T is used for nearest neighbor classification.

Figure 10:
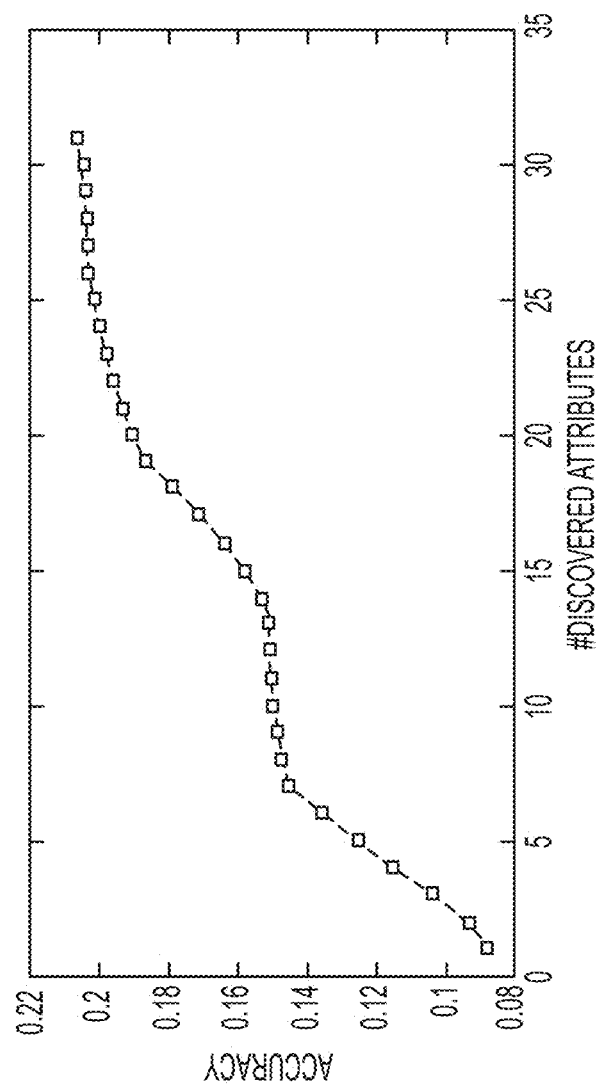
FIG. 10 is a plot of the accuracy of an exemplary vehicle classifier relative to the number of discovered attributes for a BMVC car dataset.
Figure 11:
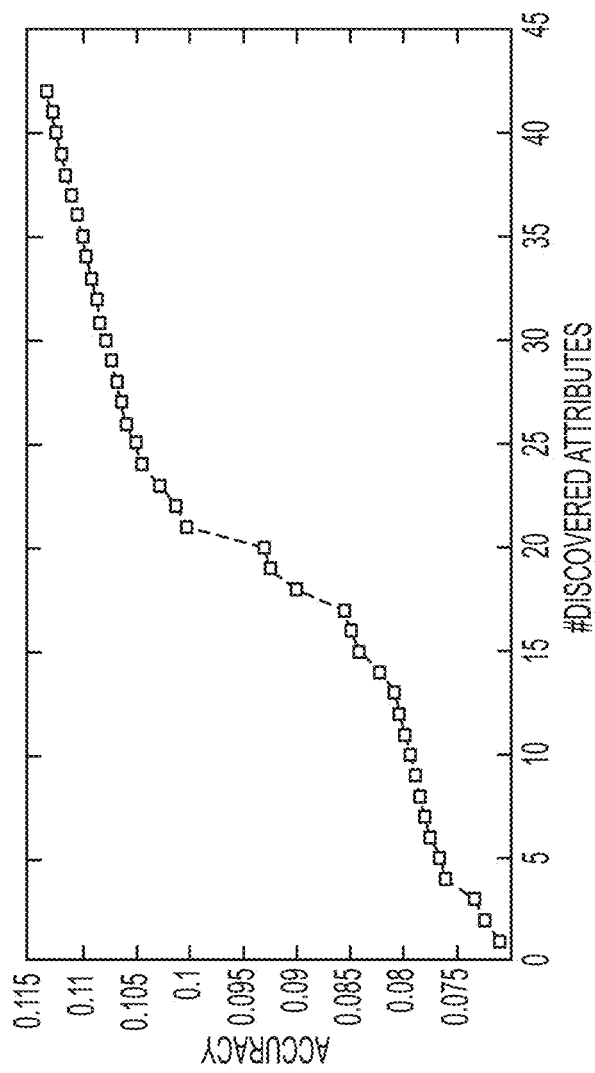
FIG. 11 is a plot of the accuracy of an exemplary vehicle classifier relative to the number of discovered attributes for an INRIA® vehicle dataset.
Figure 12:
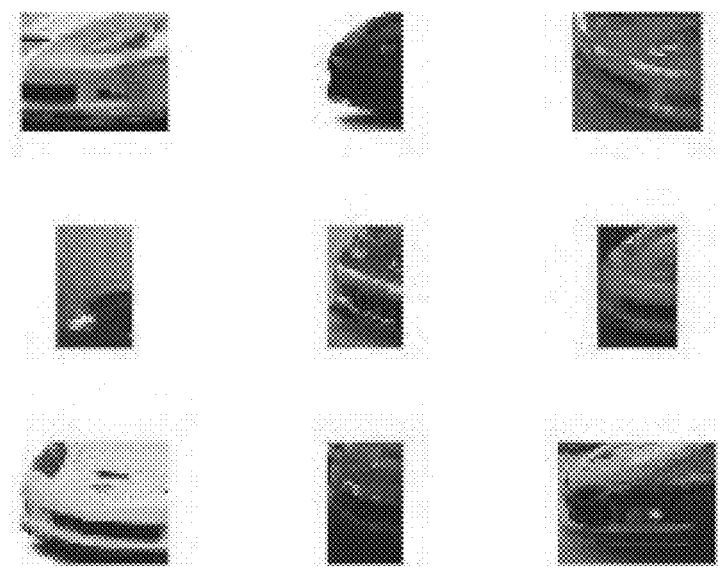
FIGS. 12-15 are examples of automatically generated regions for local attributes for a BMVC car data set, according to an exemplary embodiment of the disclosure, where each mosaic, i.e. figure, represents one discovered local attribute for a particular viewpoint associated with a vehicle category, i.e. model.
Figure 13:
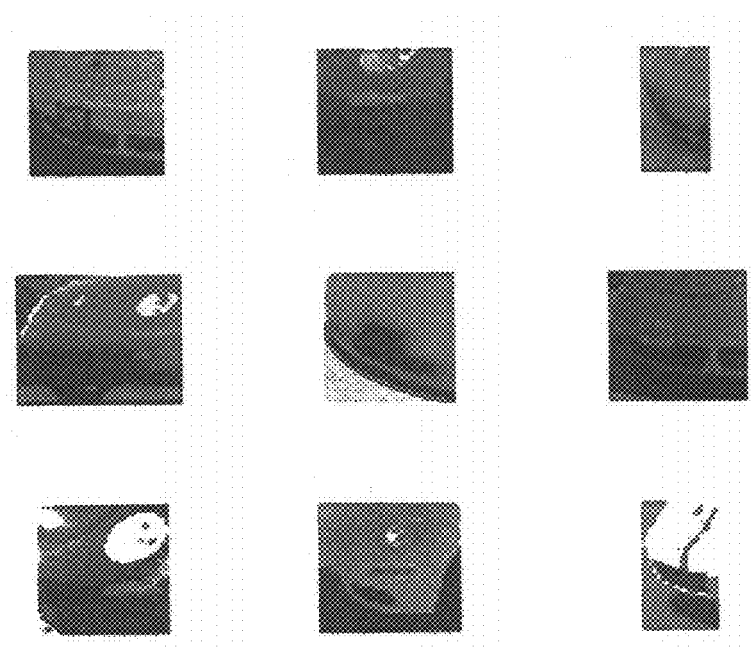
Figure 14:
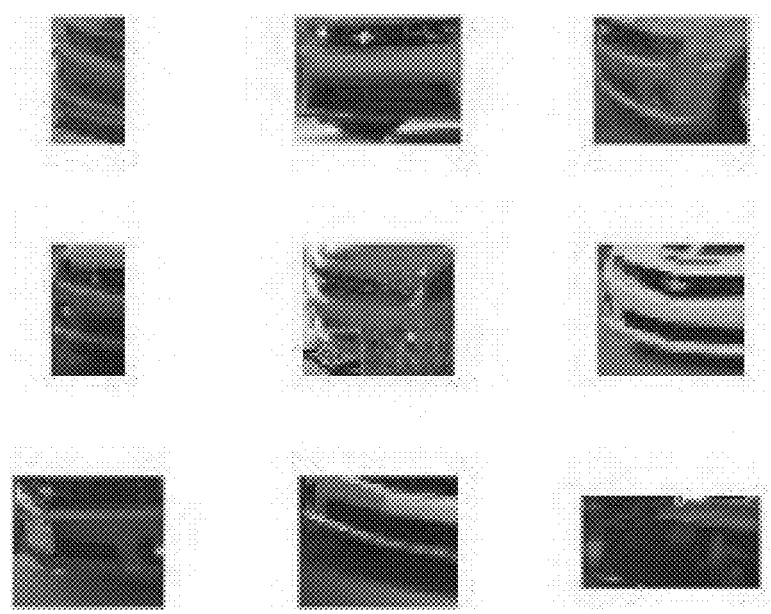
Figure 15:
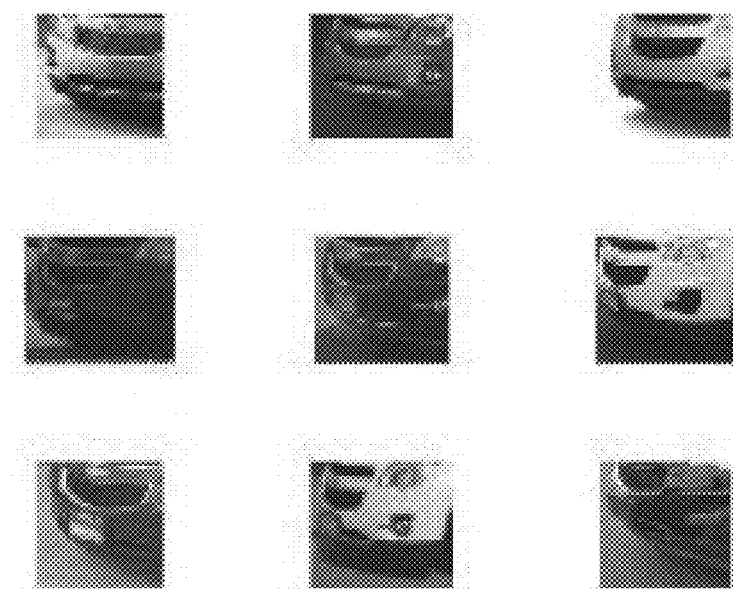

Each attribute is learned by treating one category as a positive class in each iteration, and training one discriminative SVM classifier per viewpoint for that attribute. Supposing there are K fine-grained vehicle classes, and N iterations are preferred in the attribute discovery process, then there are, at most, K×N attributes. However, not all such attribute candidates are beneficial to the overall classification performance, and therefore a greedy feed-forward attribute selection method is used and a newly generated attribute is kept only if it improves the overall classification, otherwise it is dropped. The classification performance for using multiple attributes on the first dataset is summarized in FIGS. 10 and 11.

Qualitative Results

Attributes are visual characteristics that are both discriminative and semantically meaningful. FIGS. 12-15 show mosaics of some of the learned visual local attributes from the attribute discovery process described. These semantic and discriminative visual attributes can be used in many applications such as vehicle retrieval based on text queries, vehicle image annotation, etc.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of classifying a digital image of an object, the method comprising:
  a) receiving a digital image of an object to be classified with a processor; and
  b) classifying the digital image with a constrained multiple-instance support vector machine (MI-SVM) classifier, the constrained MI-SVM classifier having been automatically trained using a plurality of training images, the training images including a plurality of object types from a plurality of viewpoints, each training image including an image of an object associated with one of the plurality of object types and one of the plurality of object viewpoints, an associated object type label and an associated viewpoint label, the constrained MI-SVM classifier trained by sampling each training image to generate a bag of image regions associated with each training image, discovering a discriminative image region associated with each training image, and generating a collection of discriminative image regions for each of the plurality of object types and each of the plurality of viewpoints,
wherein the constrained MI-SVM classifier is trained using an iterative process that initially selects an initial discriminative image region for a first object type at the plurality of viewpoints and iteratively selects subsequent discriminative image regions of the first object type at the plurality of viewpoints where the selection of a subsequent discriminate image region is constrained by one or more characteristics of selected discriminative image regions associated with other viewpoints of the first object type.

2. The computer implemented method of classifying a digital image according to claim 1, wherein a plurality of classifiers are associated with the constrained MI-SVM classifier, each classifier associated with one of the plurality of object viewpoints.

3. The computer implemented method of classifying a digital image according to claim 1, wherein the plurality of object types are associated with a plurality of vehicle types.

4. The computer implemented method of classifying a digital image according to claim 3, wherein the plurality of viewpoints include two or more of a front viewpoint of the vehicle, a rear viewpoint of the vehicle, and side viewpoint of the vehicle.

5. The computer implemented method of classifying a digital image according to claim 1, wherein the one or more characteristics include location, geometry and appearance of the subsequent discriminative image region relative to the selected discriminate image region associated with other viewpoints of the first object type.

6. The computer implemented method of classifying a digital image according to claim 1, wherein the MI-SVM classifier is formulated as $$\min_{\{w^{(v)}, C^{(v)}\}} \sum_{v=1}^{V} \left( \frac{1}{2} \|w^{(v)}\|^2 + C^{(v)} \sum_{I^{(v)}} \xi_{I^{(v)}} \right)$$

s.t. (subject to)

$$Y_I(w^{(v)} \cdot x_I^{S_I} + b^v) \geq 1 - \xi_{I(v)}$$

where W represents a hyperplane slope of a hyperplane associated with the MI-SVM,
C is a cross validated selective constant,
b represents an offset of the hyperplane,
I represents a bag of image regions associated with a training image,
$S_I$ represents an image region selected for bag I;
v represents a view point,
V represents a total number of viewpoints v,
$x_I^{S_I}$ represents an image region selected from bag I,
$Y_I$ represents the object type label associated with bag I, and
$\xi_{I(v)}$ represents a fixed value.

7. The computer implemented method of classifying a digital image according to claim 6, wherein an iterative process is used between training of the $w^{(v)}$ and reasoning about image region selection based on positive bags including at least one discriminative image region including a CRF (Conditional Random Field), where $$E(\{L_I\} | \{v_i\}) = \sum_I \varphi(L_I | v_I) + \sum_I \sum_J \delta(L_I, L_J | v_I, v_J)$$

where $$\varphi(L_I | v_I) = -(w^{(vI)} \cdot x_I^{LI} + b^{(vI)}), \text{ and}$$

the pairwise terms $(L_I, L_J | v_I, v_J)$ account for geometry and appearance constraints relative to a plurality of viewpoints,
$L_I$ and $L_J$ represents a variable based on indices of an image region selected within bag I,
E represents an energy function which is minimized,
δ is an energy term, and
φ is an energy term.

8. The computer implemented method of classifying a digital image according to claim 1, wherein the sampling of a plurality of image regions is one of uniformly sampling along image dimensions, uniform sampling associated with an area of the image determined to include an object, and sampling based on a detection response map.

9. The computer implemented method of classifying a digital image according to claim 1, wherein one or more of a bounding box and a DPM (Deformable Part Model) is used to train the MI-SVM.

10. The computer implemented method of classifying a digital image according to claim 1, wherein the constrained MI-SVM classifier is configured to generate a plurality of collections of discriminative image region representations, each collection including a plurality of discriminative image regions associated with an attribute of vehicle type, the attribute including one of a vehicle model, a vehicle feature and a vehicle style, and each collection associated with a semantic indicating the attribute associated with each collection.

11. An image processing system comprising:
a controller configured to receive a digital image of a vehicle including one of a plurality of vehicle types, the controller configured to execute instructions to perform a method of classifying the digital image of the vehicle as one of the plurality of vehicle types, the method comprising:
a) receiving a digital image of an object to be classified; and
b) with a processor, classifying the digital image with a constrained multiple-instance support vector machine (MI-SVM) classifier, the constrained MI-SVM classifier having been automatically trained using a plurality of training images, the training images including a plurality of object types from a plurality of viewpoints, each training image including an image of an object associated with one of the plurality of object types and one of the plurality of object viewpoints, an associated object type label and an associated viewpoint label, the constrained MI-SVM classifier trained by sampling each training image to generate a bag of image regions associated with each training image, discovering a discriminative image region associated with each training image, and generating a collection of discriminative image regions for each of the plurality of object types and each of the plurality of viewpoints,
wherein the constrained MI-SVM classifier is trained using an iterative process that initially selects an initial discriminative image region for a first vehicle type at the plurality of viewpoints and iteratively selects subsequent discriminative image regions of the first vehicle type at the plurality of viewpoints where the selection of a subsequent discriminate image region is constrained by one or more characteristics of selected discriminative image regions associated with other viewpoints of the first vehicle type.

12. The image process system according to claim 11, wherein a plurality of classifiers are associated with the constrained MI-SVM classifier, each classifier associated with one of the plurality of vehicle types.

13. The image process system according to claim 11, wherein the plurality of vehicle types are associated with models of vehicles.

14. The image process system according to claim 11, wherein the plurality of viewpoints include two or more of a front viewpoint of the vehicle, a rear viewpoint of the vehicle, and side viewpoint of the vehicle.

15. The image process system according to claim 11, wherein the one or more characteristics include location, geometry and appearance of the subsequent discriminate image region relative to the selected discriminative image region associated with other viewpoints of the first vehicle type.

16. The image processing system according to claim 11, wherein the MI-SVM classifier is formulated as:

$$\min_{\{w^{(v)}, C^{(v)}\}} \sum_{v=1}^{V} \left( \frac{1}{2} \|w^{(v)}\|^2 + C^{(v)} \sum_{I^{(v)}} \xi_{I^{(v)}} \right)$$

s.t. (such that)

$$Y_I(w^{(v)} \cdot x_I^{S_I} + b^v) \geq 1 - \xi_{I^{(v)}}$$

where W represents a hyperplane slope of a hyperplane associated with the MI-SVM,
  C is a cross validated selective constant,
  b represents an offset of the hyperplane,
  I represents a bag of image regions associated with a training image,
  $S_I$ represents an image region selected for bag I;
  v represents a view point,
  V represents a total number of viewpoints v,
  $x_I^{S_I}$ represents an image region selected from bag I,
  $Y_I$ represents the vehicle type label associated with bag I, and
  $\xi_{I(v)}$ represents a fixed value.

17. The image processing system according to claim 16, wherein an iterative process is used between training of the $w^{(v)}$ and reasoning about image region selection based on positive bags including at least one discriminative image region including a CRF (Conditional Random Field), where $$E(\{L_I\} | \{v_i\}) = \sum_I \varphi(L_I | v_I) + \sum_I \sum_J \delta(L_I, L_J | v_I, v_J)$$

where $\varphi(L_I|v_I) = -(w^{(vI)} \cdot x_I^{L_I} + b^{(vI)})$, and the pairwise terms ($L_I, L_J | v_I, v_J$) account for geometry and appearance constraints relative to a plurality of viewpoints,
  $L_I$ and $L_J$ represent variables based on indices of an image region selected within bag I,
  E represents an energy function which is minimized,
  δ is an energy term, and
  φ is an energy term.

18. The image processing system according to claim 11, wherein the sampling of a plurality of image regions is one of uniformly sampling along image dimensions, uniform sampling associated with an area of the image determined to include a vehicle, and sampling based on a detection response map.

19. The image processing system according to claim 12, wherein one or more of a bounding box and a DPM (Deformable Part Model) is used to train the MI-SVM.

20. The image processing system according to claim 11, wherein the constrained MI-SVM classifier is configured to generate a plurality of collections of discriminative image region representations, each collection including a plurality of discriminative image regions associated with an attribute of vehicle type, the attribute including one of a vehicle model, a vehicle feature and a vehicle style, and each collection associated with a semantic indicating the attribute associated with each collection.

21. A computer implemented method of training a constrained multiple instance support vector machine (MI-SVM) classifier to classify digital images of an object, the method comprising:
  a) inputting to the constrained MI-SVM classifier a plurality of training images, each training image including an object image associated with one of a plurality of object types and one of a plurality of object viewpoints, an associated object type label and associated viewpoint label;
  b) the constrained MI-SVM classifier sampling each training image to generate a plurality of image regions providing a bag of image regions associated with each training image; and
  c) the constrained MI-SVM classifier processing the bags of image regions associated with each training image to discover a discriminative image region associated with each training image, and generate a collection of discriminative image regions for each of the plurality of object types and each of the plurality of viewpoints,
  wherein the constrained MI-SVM classifier is trained using an iterative process that initially selects an initial discriminative image region for a first object type at the plurality of viewpoints and iteratively selects subsequent discriminative image regions of the first object type at the plurality of viewpoints where the selection of subsequent discriminate image region is constrained by one or more characteristics of selected discriminative image regions associated with other viewpoints of the first object type.

22. The computer-implemented method of training a classifier according to claim 21, wherein the plurality of object types are associated with a plurality of vehicle types.

* * * * *